(12) United States Patent
Collot et al.

(10) Patent No.: US 6,330,086 B1
(45) Date of Patent: Dec. 11, 2001

(54) DIGITAL HOLOGRAPHY DEVICE

(75) Inventors: Laurent Collot; Frédérique Le Clerc, both of Paris; Michel Gross, Villepinte, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/543,549

(22) Filed: Apr. 5, 2000

(30) Foreign Application Priority Data

Apr. 6, 1999 (FR) .................................................. 99 04259

(51) Int. Cl.$^7$ .............................. G03H 1/08; G03H 1/02; G01B 9/02; G01B 9/021
(52) U.S. Cl. ................... 359/9; 359/28; 359/30; 359/32; 356/345; 356/347
(58) Field of Search ................... 359/32, 1, 11, 359/30, 33, 9, 28; 356/345, 347, 368

(56) References Cited

U.S. PATENT DOCUMENTS

| | | |
|---|---|---|
| 4,066,927 | 1/1978 | Gross . |
| 4,088,924 | 5/1978 | Gross . |
| 4,142,772 | 3/1979 | Lurie . |
| 4,143,341 | 3/1979 | Gross . |
| 4,158,154 | 6/1979 | Gross . |
| 4,158,177 | 6/1979 | Archambault et al. . |
| 4,286,239 | 8/1981 | Gross . |
| 4,293,828 | 10/1981 | Gross . |
| 4,297,662 | 10/1981 | Gross et al. . |
| 4,311,970 | 1/1982 | Bert et al. . |
| 4,315,275 | 2/1982 | Bert et al. . |
| 4,639,139 | 1/1987 | Wyant et al. . |
| 4,834,111 | * 5/1989 | Khanna et al. ....................... 356/351 |
| 5,194,403 | 3/1993 | Delage et al. . |
| 5,200,357 | 4/1993 | Collot et al. . |
| 5,736,958 | 4/1998 | Turpin . |
| 5,805,316 | 9/1998 | Shinoda et al. . |
| 6,078,392 | * 6/2000 | Thomas et al. ....................... 356/348 |

OTHER PUBLICATIONS

"Real–time holographic interferometry: a microcomputer system for the measurment of vector displacements" P. Hariharan et al, Applied Optics vol. 22, No. 6 pp. 876–880.*
Ichirou Yamaguchi, Optics Letters, vol. 22, No. 16, pp. 1268 to 1270, "Phase–Shifting Digital Holography", Aug. 15, 1997.

* cited by examiner

*Primary Examiner*—Audrey Chang
(74) *Attorney, Agent, or Firm*—Oblon, Spivak, McClelland, Maier & Neustadt, P.C.

(57) ABSTRACT

A digital holography device, applicable for example to the 3D mapping of objects, is used to determine the complex amplitude of a signal wave coming from an object illuminated by a known illumination wave. For this purpose, the device includes a source for the generation of two mutually coherent waves, the object illumination wave and a reference wave, the two waves having a phase difference $\phi_r(t)$ that is a function of time. The device also includes a mechanism configured to induce an interference, on a detection device, between the reference wave and the signal wave coming from the object. The detection device enables a temporal sampling of the interference pattern resulting in the acquisition of a number N of interferograms, N being greater than or equal to 2. Each interferogram corresponds to a distinct phase difference between the signal wave and the reference wave that are incident on the detection device, the complex amplitude of the signal wave being then determined from the processing of the interferograms.

18 Claims, 5 Drawing Sheets

DIGITAL HOLOGRAPHY DEVICE

BACKGROUND OF THE INVENTION

1. Field of the Invention

The invention relates to a digital holography device, for example used for the 3D mapping of objects, and especially moving objects, for example under vibration, and also for the measurement of optical components or the study of scattering media.

2. Description of the Prior Art

Conventional holography, invented by Dennis Gabor in 1948, underwent development particularly in the 1960s with the appearance of lasers. It is a method by which it is possible to reconstruct a 3D image of any object from a recording made on a photographic plate called a hologram, without the assistance of any objective. Today, the applications of conventional holography are numerous. A real 3D image that is obtained during restitution gives an impressive effect of relief. It is thus possible to obtain beautiful holograms of art objects, even fairly big ones. In science and industry, holographic interferometry enables the study of changes in the shape of a variety of elements, under different forces, such as for example the study of fluid flows in wind tunnels.

Figure 1A:
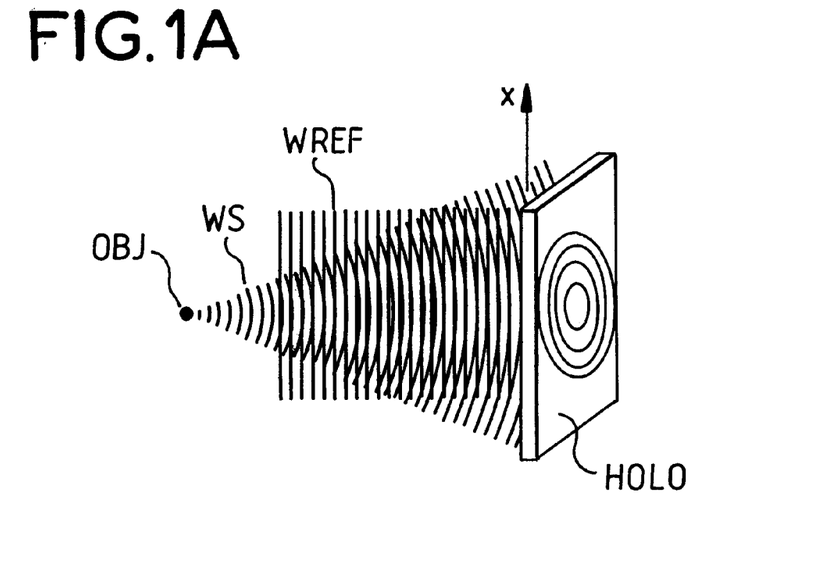
FIGS. 1A and 1B are drawings that illustrate the recording and restitution of a conventional hologram (already commented upon)
Figure 1B:
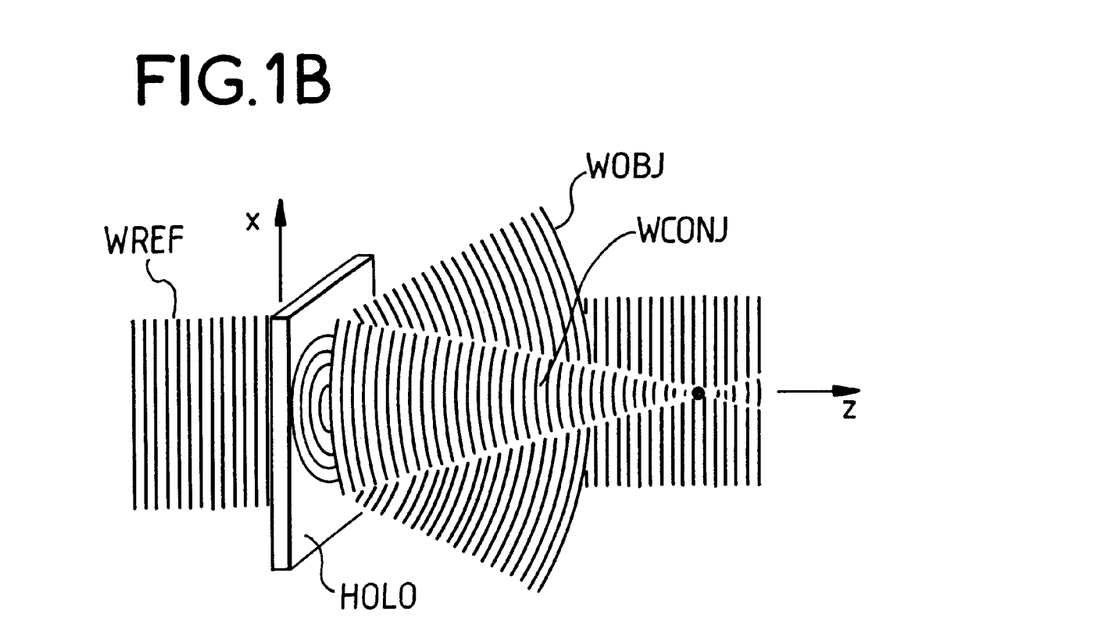

FIGS. 1A and 1B show the recording and restitution of a conventional hologram of a source point OBJ. During the recording (FIG. 1A) a recording is made, on a photographic plate HOLO, of the variations in intensity due to the interferences of a reference wave WREF, for example a plane wave, with a coherent wave WS scattered by the object. After development according to ordinary methods of photography, the photographic plate constitutes the hologram. During the restitution (FIG. 1B), the hologram HOLO is illuminated by the reference wave WREF and produces two waves of diffractive light, one wave WOBJ that reconstitutes a virtual 3D image of the object and one conjugate wave WCONJ that forms a real image of the object point OJB, which is a parasitic image to be eliminated. One way to separate the diffractive waves then consists of the use of a thick material as the holographic emulsion. Thus, a so-called volume hologram is made in which the interferences occur throughout the thickness of the material. At restitution, the diffraction obeys the Bragg condition and only the object wave is diffracted.

However, while excellent-quality images can be reconstituted through a very high resolution of the photographic emulsions, there is no direct access to the information registered. This limits the applications of conventional holography to qualitative observations. It is not possible for example to make a 3D mapping of an object or have access to quantitative measurements of the photometry parameters. To overcome this drawback and obtain information that can be quantitatively exploited, new techniques of holography have appeared. These techniques replace the photographic film by a 2D optoelectronic detector, for example a CCD camera. In digital holography devices, the interferences between the reference wave and a wave scattered by the object (the signal wave) are recorded in the plane of the detector. These two waves have come from the same laser source in order to meet the conditions of coherence. The acquisition of the interference signal by the detector makes it possible to digitize the information and determine sampled values of the phase and amplitude of the scattered wave. These data elements may then be exploited to obtain quantitative results on the object.

However, just as in conventional holography on thin films, the field pattern of the computed signal wave simultaneously shows the desired order, namely the zero order, and a parasitic conjugate order. There is therefore a degree of indeterminacy in the complex amplitude of the scattered wave that is to be determined. This indeterminacy has repercussions on the quality of the results obtained by this technique. For example, the mapping of the object to be established will be determined with lack of precision.

The digital holography device according to the invention enables the full and extremely precise determination of the complex amplitude of the wave scattered by the object. This full determination is furthermore very well suited to the study of vibrating objects for example.

SUMMARY OF THE INVENTION

For this purpose, the invention relates to a device used to determine the complex amplitude $A_s(r,z)$ of a signal wave coming from an object illuminated by a known illumination wave, the device comprising means of optoelectronic detection and furthermore comprising:

means for the generation of two mutually coherent waves, the object illuminating wave and a known reference wave, the two waves having a known phase difference $\phi_r(t)$ that is a function of time, means to obtain interference, on the detection means, between the reference wave and the signal wave coming from the object, the detection means enabling a temporal sampling of the interference pattern resulting in the acquisition of a given number N of interferograms $I_i(r,t)$, N being greater than or equal to 2, each interferogram corresponding to a distinct phase difference between the signal wave and the reference wave that are incident on the detection means, processing means making it possible, on the basis of said interferograms, to determine a digital hologram of the object corresponding to the expression, in a given plane $\Pi(z)$, of the complex amplitude $A_s(r,z)$ of the signal wave coming from the object.

BRIEF DESCRIPTION OF THE DRAWINGS

The advantages and characteristics of the invention shall appear from the following description, illustrated by the appended figures, of which.

MORE DETAILED DESCRIPTION

Figure 2:
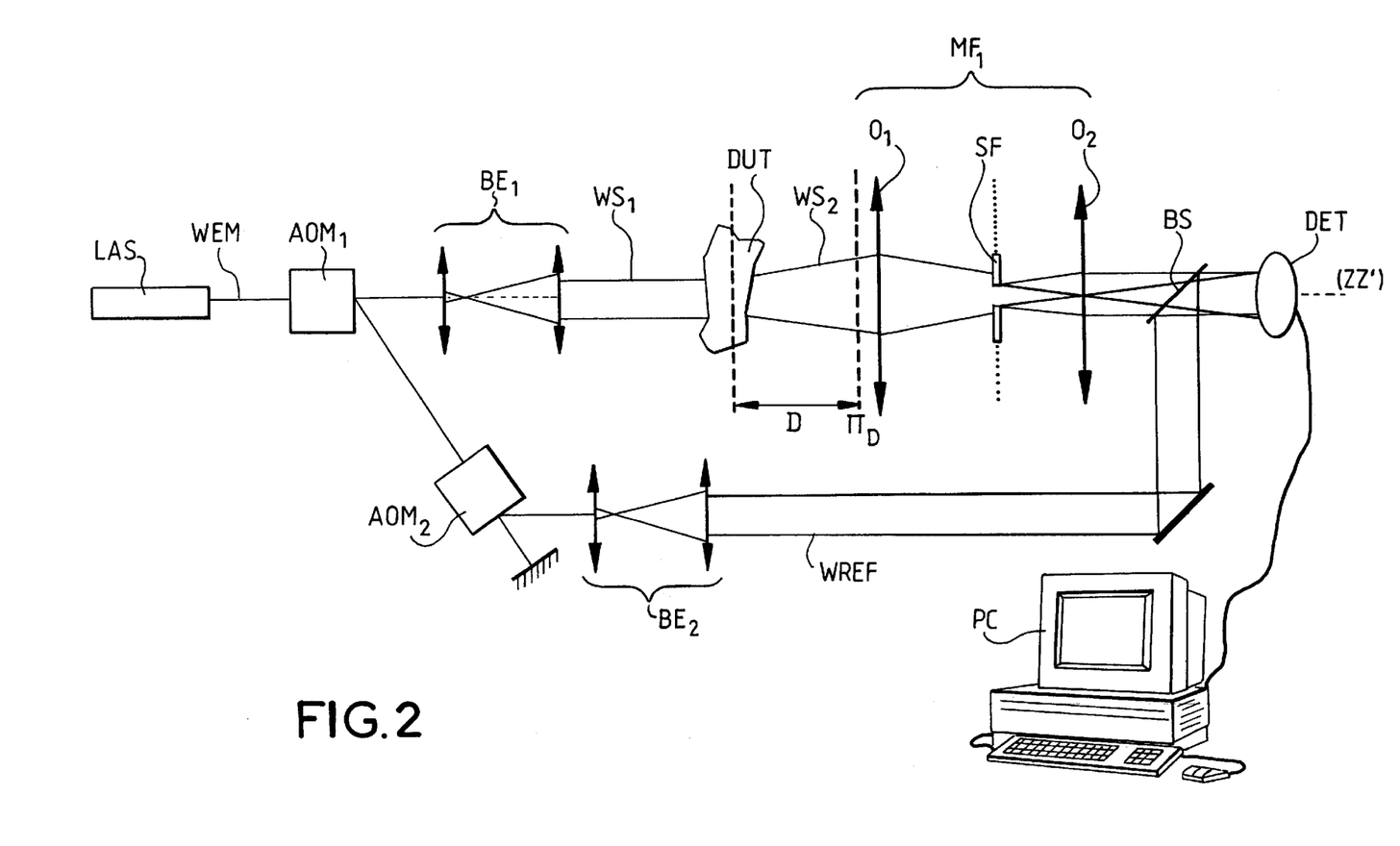
FIG. 2 is a drawing of an exemplary device according to the invention.

FIG. 2 is a drawing of a first exemplary digital holography device according to the invention. It is sought to determine the complex amplitude $A_s(r,z)$ of the signal wave $WS_2$ coming from the object or <<device under test>> DUT when it is illuminated by a known illumination wave $WS_1$ having a given axis (zz'), for example a plane wave. The term 'digital hologram of the object' herein refers to the expression of the complex amplitude $A_s(r,z)$ in a given plane $\Pi(z)$ perpendicular to the axis (zz') of the illumination wave of the object, where z is the coordinate of the plane Π(z) on the axis zz', taken with reference to an arbitrary reference, and r is the position vector of a point occurring in said plane. The object DUT is for example a light-scattering object for which it is sought to establish a mapping, namely a surface or volume image. Or it is an optical system for which it is sought to measure the aberrations. Unlike the prior art devices, the complex amplitude of the signal wave is determined without ambiguity on the value of the phase and is specially well applied to the study of vibrating objects.

For this purpose, the device according to the invention comprises means for the generation of two mutually coherent waves, the object illumination wave and a reference wave, the two waves having a known phase difference $\phi_i(t)$ that is a function of time (t). Advantageously, the generation means of the device according to the invention comprise a coherent source LAS, for example a laser source, emitting an emission wave WEM, and two acousto-optical modulators $AOM_1$ and $AOM_2$, working at predetermined frequencies on opposite orders of diffraction, in order to form the object illumination wave $WS_1$ and the reference wave WREF from the emission wave WEM with the phase difference between the two waves $\phi_i(t)$. The use of acousto-optical modulators makes it possible especially to obtain very high precision in setting up the phase difference $\phi_i(t)$. According to another variant, the illumination wave and the reference wave may be formed by two independent laser sources that are phase-locked by an electronic automatic control loop. Exemplary modes of implementation of the phase shift between the waves shall be seen in greater detail here below.

The device furthermore comprises means BS, for example a separating plate in the case of FIG. 2, to bring about interference, on the detection means DET, between the reference wave WREF and the signal wave $WS_2$ coming from the object. The detection means DET in this example are formed by a mono-element detector shifted mechanically or, advantageously, they are formed by a set of elementary detectors distributed linearly or in matrix form and enabling image acquisition at a predetermined rate $f_{im}$ and with a given integration time $T_{int}$. The detector is for example, as shown in FIG. 2, a CCD matrix camera whose sensitive surface is substantially normal to the axis (zz') of the illumination wave.

According to the invention, the detection means enable a temporal sampling of the interference figure resulting in the acquisition of a given number N of interferograms $I_i(r,t)$, with N greater than or equal to 2, each corresponding to a distinct phase difference between the signal wave and the reference wave that are incident on the detection means. In practice, it is advantageously possible to have N greater than or equal to 3 if it is desired, by computation, to cancel out the measurement bias introduced by the detector. In the example of FIG. 2 which uses a detector having an integration time $T_{int}$, for example a CCD camera, the interferogram $I_i(r,t)$ is averaged during the integration time, resulting in an averaged interferogram $I_i(r)$ whose expression is given by:

$$I_i(r) = \frac{1}{T_{int}} \int_{t_i}^{t_i+T_{int}} I_i(r,t) dt$$

where $t_i$ is the instant of acquisition of the interferogram with an index i. Each averaged interferogram $I_i(r)$ corresponds to a value of the phase difference $\phi_i$ at the instant of acquisition $t_i$. The device furthermore comprises processing means which, on the basis of the averaged interferograms, can be used to determine a digital hologram of the object corresponding to the expression in a given plane Π(z), with a complex amplitude $A_s(r,z)$, of the signal wave coming from the object. In the example of FIG. 2, the computations are performed for example by means of a microcomputer PC that is fast enough to carry out real-time computations. With the complex amplitude $(A_s(r,z_0))$ of the signal wave in the plane of the detector being known, it is possible, by a standard operation of propagation, to determine the complex amplitude $(A_s(r,z))$ of the signal wave at any point of the free space between the object and the detector.

Figure 3A:
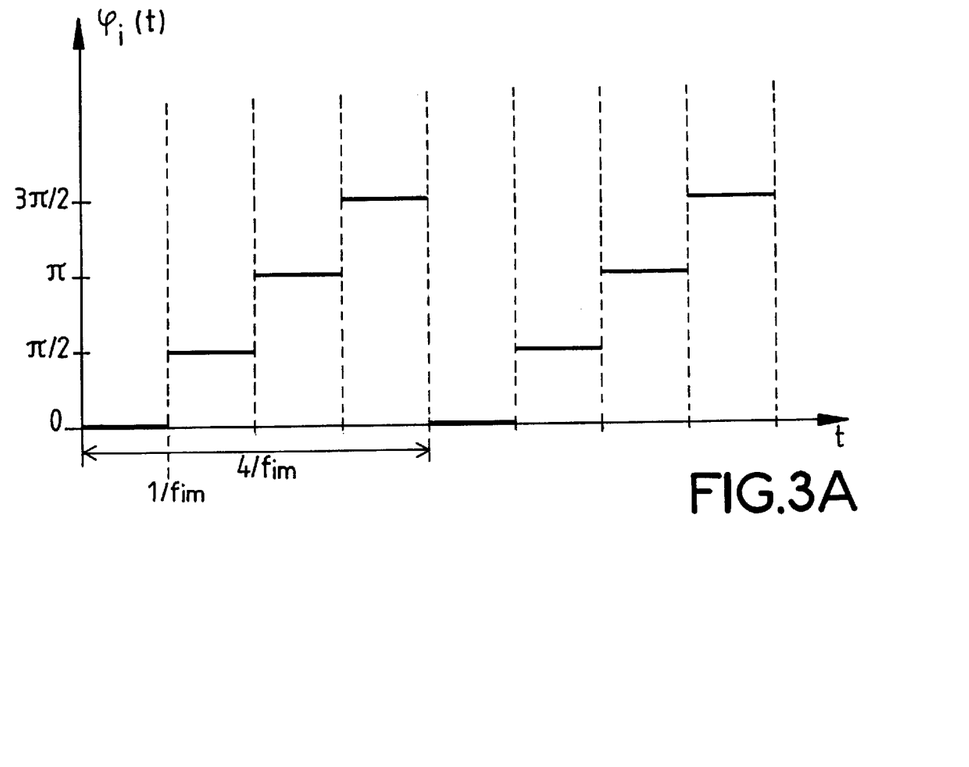
FIGS. 3A and 3B are graphs giving a view, as a function of time, of the value of the phase difference according to two examples.

According to one variant, the phase difference $\phi_i(t)$ is variable by stages as a function of time. It is periodic. Successively, during a period equal to the ratio $N/f_{im}$, it takes N distinct values. This variant is illustrated by FIG. 3A, which shows the value of the phase difference as a function of time. In this case, N is equal to four and the phase difference takes four distinct values equal to 0, π/2, π, 3π/2, for durations substantially equal to $1/f_{im}$.

According to a preferred variant, the reference wave WREF and the illumination wave $WS_1$ show a frequency offset $F_0$. The interference between the reference wave WREF and the signal wave $WS_2$ coming from the object that results in an interferogram $I(r,t)$ modulated as a function of time, has a sine modulation at said frequency $F_0$. Indeed, this variant makes it possible especially, as shall be explained hereinafter, to study vibrating objects by adjusting the offset frequency $F_0$ between the two waves.

Figure 3B:
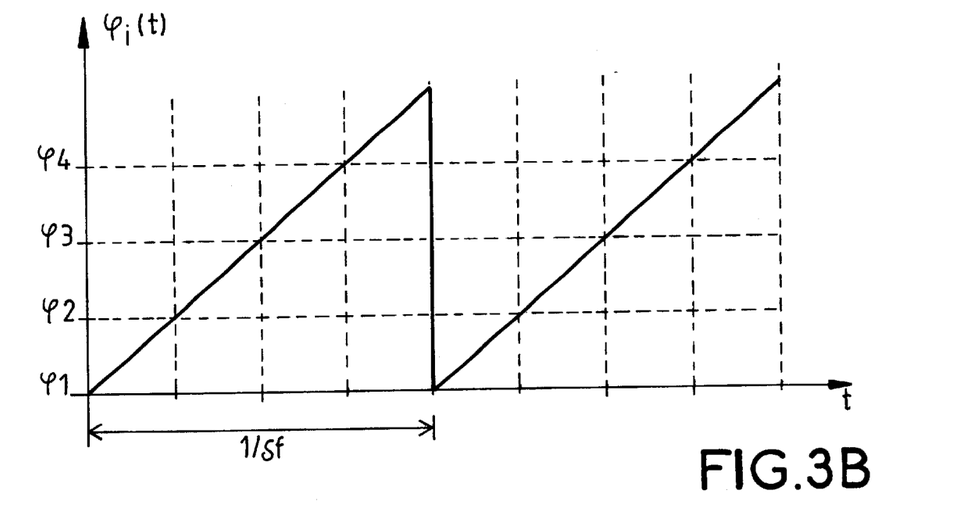

For example, in the case of the study of a substantially immobile object, the offset frequency is substantially equal to the ratio $\delta f = f_{im}/N$ between the acquisition frequency $f_{im}$ of the detector and the number N. This ratio, in the case of a video camera for example, is a frequency with a low value (typically 10 Hz). In this case, the interferogram $I(r,t)$ has a sine modulation, as a function of time, at said frequency $\delta f$ and the phase difference between the two waves is linear by intervals as a function of time. This phase difference goes from 0 to 2π on a time interval equal to $1/\delta f$, as shown in FIG. 3B. By synchronizing, for example, the acquisition of the detector with the frequency of modulation of the interferogram $I(r,t)$, there is obtained a sequence of N averaged interferograms $I_i(r)$ corresponding to N values $\phi_i$ of the phase difference averaged during the integration time of the detector. In FIG. 3B, N is equal to four and $\phi_1$, $\phi_2$, $\phi_3$ and $\phi_4$ are respectively references of the four values of the averaged phase difference.

The device according to the invention also makes it possible to study vibrating objects, for example by using acousto-optical modulators, an exemplary implementation of which shall be described in detail here below. The object, having at least one vibration frequency $f_v$, is for example illuminated in reflection. The offset frequency $F_0$ between the reference wave WREF and the illumination wave $WS_1$ is then adjusted to be substantially equal to the sum of the vibration frequency $f_v$ and the ratio $\delta f$ of the acquisition rate $f_{im}$ to the number N of interferograms (typically N=4) or to the sum of one of the harmonics $f'_v$ of the vibration frequency $f_v$, equal to the product $M.f_v$ of said vibration frequency with a relative integer M=0, 1, −1, 2, −2, etc., and the ratio $\delta f$ of the acquisition rate $f_{im}$ to the number N of interferograms (typically N=4). In other words, this offset frequency is:

$F_0 = M.f_v + \delta f$

Advantageously, since the frequency offsets of the acousto-optical modulators correspond to synthesized frequencies, programmable by means of a digital synthesizer, it is possible through the device of the invention to make measurements throughout the vibration spectrum of the object by making the offset frequency $F_0$ vary so that it corresponds to the fundamental frequency of the vibration $f_v$ explored and to the harmonic rank M chosen.

The device according to the invention thus makes it possible to obtain a digital demodulation of the interferogram $I_r(r,t)$ at a demodulation frequency whose magnitude is that of the rate of acquisition of the detector. For example, the demodulation frequency is substantially equal to the ratio $f_{im}/N$.

In certain cases, for example in the case of a shifting object, the interferogram may show temporal modulations at frequencies other than the difference in frequency induced by the phase modulation $\phi_r(t)$. In this case, an appropriate demodulation frequency will be chosen.

Let us now take a more precise look at the way in which the device according to the invention, and as described in the example of FIG. 2, can be used to determine, in the plane of the detector, the complex amplitude $A_s(r,z_0)$ of the wave coming from the object, on the basis of the N interferograms. We shall consider for example the case in which the reference wave, with respect to the illumination wave, has a frequency shift $F_0$ that is substantially equal to the ratio $\delta f$. The fields $E_s(r,t)$ and $E_0(r,t)$ of the signal wave $WS_2$ and reference wave WREF can be written as a function of the time t and the position vector r:

$$E_s(r,z_0,t) = A_s(r,z_0)\exp(i2\pi f_s t)$$

$$E_0(r,z_0,t) = A_0(r,z_0)\exp(i2\pi f_0 t) \quad (1)$$

where $f_s$ is the frequency of the signal wave and $f_0$ is the frequency of the reference wave, with $f_0 = f_s + \delta f$. $A_s(r,z_0)$ and $A_0(r,z_0)$ are the complex amplitudes respectively of the signal wave $WS_2$ and the reference wave WREF in the plane of the detector.

After interference between the signal wave and the reference wave, the interferogram $I(r,t)$ obtained by the detection means DET is written as follows:

$$I(r,t) = \eta(E_s(r,z_0,t) + E_0(r,z_0,t)) \cdot (E^*_s(r,z_0,t) + E^*_0(r,z_0,t)) \quad (2)$$

where $\eta$ is the quantum efficiency of the detector.

Thus, if the signal wave $WS_2$ incident on the detector is split up into a superimposition of elementary plane waves and, for a plane reference wave WREF with a constant phase $\phi_0$, the component of the interferogram corresponding to an elementary plane wave of the signal wave is written as follows:

$$I(r,t) = \eta|A_0|2\Re[A_s(r)\exp(-i\phi_0)\exp[i(k_s-k_0) \cdot r + 2\pi\delta f \cdot t]] \quad (3)$$

where $k_s$ and $k_0$ are the wave vectors respectively of the elementary signal wave and the reference wave. It must be noted that this type of detection enables the measurement of the complex amplitude of the signal wave in the mode of the reference wave. Thus, if the reference wave is linearly polarized, the signal field will be measured according to his polarization.

According to the expression (3), it is seen that the interferogram $I(r,t)$ is modulated both spatially and temporally. To obtain information that can be exploited, it is necessary that the density of the fringes corresponding to the spatial modulation of the interference signal should not exceed the resolution of the matrix detector constituted by elementary detectors (this is called the anti-aliasing condition). With the signal wave $WS_2$ incident on the detector being decomposed into a sum of elementary plane waves of wave vectors $k_s$, the region $S_{k0}$ of the space of the wave vectors that fulfills the anti-aliasing condition for a plane reference wave, with a wave vector $k_0$, is defined by:

$$S_{k0} = \text{sinc}(d_x \cdot (k_x - k_{x0})) \cdot \text{sinc}(d_y \cdot (k_y - k_{y0})) \geq 1 - e_A \quad (4)$$

where $e_A$ is a factor of excitation quantifying the loss of contrast of the fringes related to the spatial integration of the detector, $(k_x, k_y)$ and $(k_{x0}, k_{y0})$ are respectively the components of the wave vectors $k_s$ and $k_0$ along the orthogonal axes x and y of the plane of the detector that define the directions of the sides of the elementary detectors which are assumed to be substantially rectangular and have dimensions respectively $d_x$ and $d_y$.

The condition (4) then makes it possible to define a set of vectors $k_s$ that fulfill the anti-aliasing condition for a given resolution defined by the dimensions of the elementary detectors of the detector. Thus, depending on the precision sought, the measurement has to be limited to an elementary angular field of the signal wave $WS_2$ incident on the detector, corresponding to a cone with aperture angles $\alpha_x, \alpha_y$ around the detection of the wave vector $k_0$ of the reference wave incident on the detector. The dimensions $\alpha_x$ and $\alpha_y$ of this elementary angular field must be substantially lower than or equal to $\lambda/2 \cdot d_x$ and $\lambda/2 \cdot d_y$ respectively to meet the condition (4).

Thus, when for example the object DUT is a light-scattering object and the signal wave coming from the object is split up into a superimposition of elementary plane waves of wave vectors $k_s$, only one part of the wave vectors complies with the anti-aliasing condition. Thus, the digital holography device according to the invention may comprise filtering means used to limit the direction of the wave vectors $k_s$ of the wave incident on the detector around that of the vector $k_0$ in order to strictly meet the anti-aliasing condition. Such means shall be described hereinafter.

When the anti-aliasing condition given by the equation (4) is met, the computation means of the device according to the invention can be used to determine the restriction of the hologram of the object DUT at the cone with aperture angles $\alpha_x, \alpha_y$. The restriction is determined from the demodulation of the interferograms $I_r(r,t)$ at the frequency $\delta f$ for each elementary detector. For example, for N=4, the part in phase with the reference wave of the complex amplitude $A_s(r,z_0)$ may be determined from the difference $I_3(r) - I_1(r)$ where $I_1(r)$ and $I_3(r)$ are the averaged interferograms obtained by the replacement, in the expression (3), of the expression $2\delta f t$ respectively by 0 and $\pi$. The in-quadrature part of the complex amplitude $A_s(r,z_0)$ can be determined from the difference $I_4(r) - I_2(r)$ where $I_2(r)$ and $I_4(r)$ are obtained by the replacement, in the equation (3), of the expression $2\delta f t$ respectively by $\pi/2$ and $3\pi/2$. These interferograms are obtained for example by adjusting the offset frequency $\delta f$ in such a way that this frequency must be substantially be equal to a quarter of the acquisition frequency $f_{im}$ of the detector.

This computation shows how, by using the device according to the invention, it is possible to obtain a sampled measurement of the complex amplitude of the signal wave coming from the object throughout the surface of the detector. This measurement is obtained according to a particular implementation of the device by taking the difference between the images made by the same detector at different points in time. This minimizes the possible measurement bias.

We shall now provide a more precise description, according to an exemplary embodiment, of the means of implementation of the device according to the invention in the example of FIG. 2.

The source LAS is for example a continuous helium-neon laser of some milliwatts. The detector is a CCD camera with an acquisition frequency $f_{im}$ of 25 Hz, comprising 752×582 elementary detectors with dimensions $d_x$=10.6 μm and $d_y$=8.6 μm. The laser emits an emission wave that will enable the generation of the object illumination wave $WS_1$ and the reference wave WREF. Advantageously, these waves are formed by means of two acousto-optical modulators $AOM_1$ and $AOM_2$ working at opposite orders of diffraction, respectively $\Delta f+F_0$ and $\Delta f$ with typically $\Delta f$=80 MHz and in the case, for example, of an immobile object $F_0=\delta f$ giving 6.25 Hz for N=4. This assembly enables the generation of the low frequency offset needed for the use of a video camera. In the case of the study of an object vibrating at a frequency $f_v$, for example of about 100 kHz, $F_0$ will be adjusted to $f_v+\delta f$. Here again, through the use of two acousto-optical modulators, the vibration frequency $f_v$ of the object studied may vary from the very low frequencies to several GHz.

Thus, the first acousto-optical modulator ($AOM_1$) intercepts the emission wave WEM, transmits part of the emission wave to form the object illumination wave ($WS_1$) and generates, in a given direction, a first wave that is offset in frequency with reference to the emission wave, by a first predetermined frequency variation $\Delta f_1$, for example 80 MHz+6.25 Hz. The second acousto-optical modulator $AOM_2$ intercepts the first frequency-offset wave and generates a second wave offset in frequency, with respect to the first wave, by a second frequency variation $\Delta f_2$ equal to the difference $F_0-\Delta f_1$, namely −80 MHz. The resultant wave forms the reference wave WREF and then, with respect to the object illumination wave, shows a frequency offset equal to the offset frequency $F_0$, namely in this example 6.25 Hz. Thus, at the frequency of acquisition of the CCD camera (25 Hz in this example), images $I_1(r)$, $I_2(r)$, $I_3(r)$, $I_4(r)$ are successively recorded, these images corresponding to values of the phase difference between the object illumination wave and the reference wave equal respectively to 0, $\pi/2$, $\pi$, $3\pi/2$. The acousto-optical modulators, which are simple to implement, are furthermore able to send the greatest part of the energy in the 1 or −1 order of diffraction.

Should the reference wave and the illumination wave of the object show a frequency shift $F_0$, the acousto-optical modulators, in certain applications, may be replaced by electro-optical modulators that modulate the phase or by a modulation of the power of the emission laser, enabling the generation of a comb of lateral bands in frequencies associated with this modulation. These lateral bands contain frequencies equal to the modulation frequency and to its harmonics.

Should the phase shift $\phi_r(t)$ be variable in stages as a function of time, this phase shift may be periodic, successively assuming N distinct values, in this example four values, substantially at the acquisition frequency fin of the detector. This phase shift can be obtained with means similar to those described here above, namely the implementation of two acousto-optical modulators $AOM_1$ and $AOM_2$ used on opposite signed orders of diffraction and working at the same radiofrequency but for which the phase difference is electrically controlled. The phase difference by stages may also be obtained by the conventional techniques known to those skilled in the art, for example by means of an optical delay line between the two channels. However, the use of the acousto-optical modulators enables very high precision in setting up the phase.

The illumination and reference waves may be extended by means of the afocal devices (respectively $BE_1$ and $BE_2$ in FIG. 2) in such a way that the illumination wave $WS_1$ illuminates the object DUT in its part to be analyzed and the reference wave WREF overlaps the sensitive surface of the detector DET. The means used to obtain interference between the signal wave $WS_2$ from the object DUT when it is illuminated by the illumination wave $WS_1$ and the reference wave are for example a separating plate BS that combines the two waves on the surface of the detector.

The exemplary embodiment of FIG. 2 also provides for filtering means $MF_1$ used to prevent the aliasing effects described here above. According to one example, the filtering means $MF_1$ are positioned between the object DUT and the separating plate BS and include two objectives ($O_1$, $O_2$) with parallel or merged axes forming an afocal system with, between the two objectives, an intermediate focal plane PFI. The means $MF_1$ furthermore comprise a filtering hole or special filter SF positioned in the plane PF1 and capable of being shifted in this plane.

Figure 4:
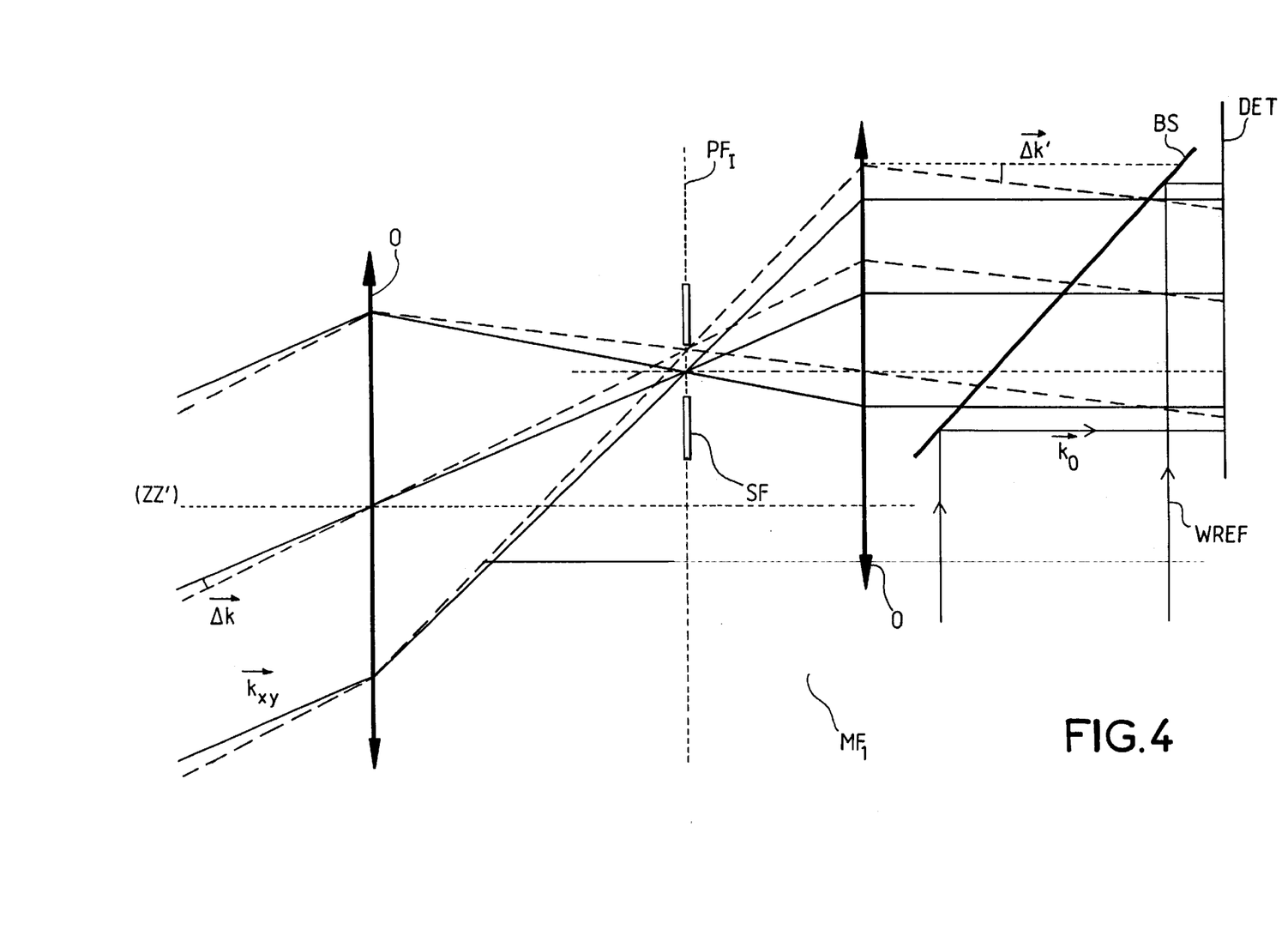
FIG. 4 is a drawing illustrating means of the device, according to a variant.

FIG. 4 gives a more precise view of the filtering means implemented in the example of FIG. 2. The first objective $O_1$ positioned in front of the object DUT, is always fixed. It makes it possible, through an optical transformation, to give access, in its focal plane, to the components of the wave vectors $k_s$ of the elementary plane waves forming the wave $WS_2$ that come from the object. With the filtering hole SF, it is possible, in a given direction of the signal wave incident to the filtering means, defined by the position of the filtering hole SF in the plane PFI and corresponding to a given wave vector $k_{xy}$, to select the directions of the incident signal wave corresponding to wave vectors $k_s$ in a given aperture. The second objective $O_2$ facing the detector DET is, according to this example, centered on the hole SF in such a way that, at output of the filtering means, the directions of the signal wave are contained in an aperture centered on a direction parallel to that of the wave vector $k_0$ of the reference wave incident on the detector DET. As explained here above, the shape and the dimensions of the hole SF are chosen according to the geometry of the elementary detectors in order to meet the anti-aliasing condition given by the equation (4). More specifically, the references taken are the dimensions $d'_x$ and $d'_y$, herein called equivalent dimensions, which are the greatest dimensions between the effective dimensions of the elementary detectors and the effective dimensions of the sampled image elements.

Thus, in this example, the filtering hole SF is a rectangular hole whose dimensions along the axis x and y are respectively smaller than or equal to $$2 \tan\left(\frac{\lambda}{2d'_x}\right) f_2$$

and $$2 \tan\left(\frac{\lambda}{2d'_y}\right) f_2,$$

where $\lambda$ is the wavelength and $f_2$ is the focal distance of the second objective $O_2$. Depending on the type of detector used and the shape of the elementary detectors, the shape of the filtering hole SF will be adapted.

As explained here above, the anti-aliasing condition is valid in the field of the detector and limits the outgoing field of the filtering means $MF_1$ to an elementary field centered on the direction of a wave vector $k_0$ of the reference wave incident on the camera. If the anti-aliasing condition is related to the field centered on the filtering means, taking account of the magnification of the afocal device forming the means $MF_1$, there is obtained a limit on the angular field of the signal $WS_2$ that is incident to the filtering means $MF_1$. The digital hologram thus obtained is an elementary digital hologram corresponding to an elementary angular field of the signal wave $WS_2$ coming from the object.

According to the invention, the digital holography device may furthermore comprise means to sweep through a set of elementary angular fields resulting in a set of elementary digital holograms, the combining of which makes it possible to obtain a wide-field digital hologram of the object DUT. The wide field digital hologram herein corresponds to the complex amplitude $A_s(x,y,z=z_D)$ of the signal wave coming from the object measured in a plane positioned up-line from the filtering means $MF_1$ and referenced $\Pi_D$ in FIG. 2. For this purpose, it is possible for example to shift the filtering hole SF, the second objective $O_2$ and the detector DET jointly and fixedly with respect to one another, in a plane perpendicular to the direction of the axes so as to select different parts of the field.

Furthermore, since the elementary angular field is fixed, the device according to the invention may also comprise means to carry out an apparent rotation of the object DUT about the direction normal to the plane of the detector DET, either by the effective rotation of the object or by the use of a parallax, each apparent position of the object also resulting in an elementary digital hologram. The combining of the elementary holograms makes it possible to obtain a high-resolution digital hologram of the object DUT.

Figure 5:
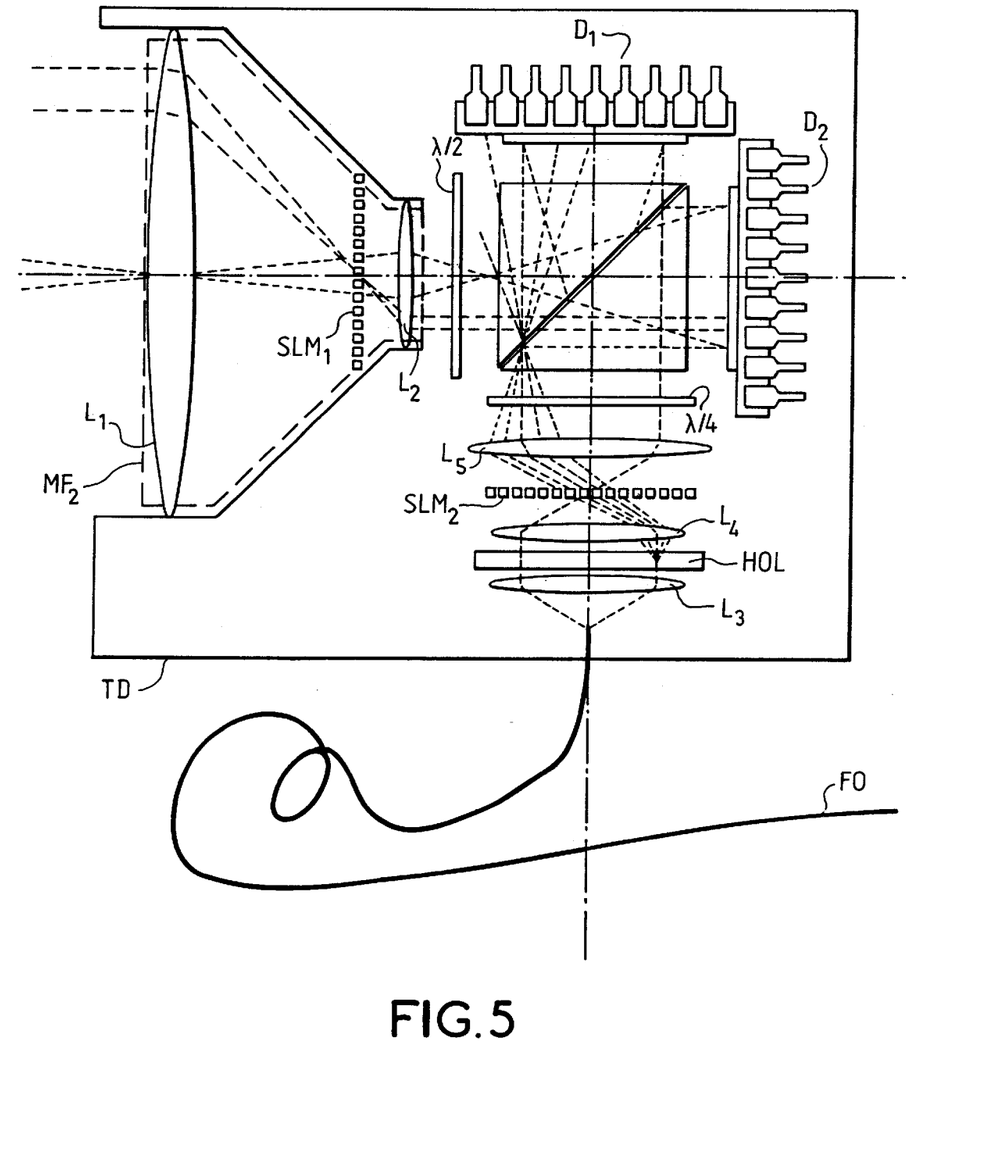
FIG. 5 is a drawing illustrating another exemplary embodiment of the device according to the invention.

FIG. 5 illustrates another example of the device according to the invention. In this example, the reference and illumination waves have a frequency offset $F_0$. The detection means are such that they enable synchronous detection of the interferograms $I_i(r,t)$, for example at a frequency substantially equal to the offset frequency $F_0$. Furthermore, the processing means that can be used to determine the digital hologram of the object are directly provided by the electronic circuitry of the detection means.

In the example of FIG. 5, the two quadrature components of the complex amplitude to be determined are demodulated on two distinct detectors $D_1$ and $D_2$. The means of generating the illumination wave of the object and the reference wave, which are coherent with each other, are made similarly to the examples described here above. These means as well as the object for which it is sought to make a digital hologram are not shown in FIG. 5. The means to obtain interference between the signal wave coming from the object and the reference wave as well as the means of detection comprising the two detectors D1 and D2 are included in the detection head TD. According to one variant, the detection head also comprises filtering means to meet the anti-aliasing condition as described here above.

In the example of FIG. 5, the detection head TD thus comprises a filtering device $MF_2$ representing an embodiment different from the one described in FIG. 2. The device $MF_2$ has two objectives $L_1$ and $L_2$ forming an afocal device similar to the system formed by $O_1$ and $O_2$ and described in FIGS. 2 to 4. The signal wave coming from the object is incident on the objective $L_1$. The filtering hole SF of the device of FIGS. 2 and 4 is herein replaced by a spatial light modulator $SLM_1$ such as for example a spatially addressed optical valve. Thus, it is possible to select the size of the aperture as a function of the desired precision and select the field aimed at without any constraint of a mechanical shift. The signal wave thus filtered goes through a half-wave plate, referenced $\lambda/2$ in FIG. 5, oriented at 22.5°, and is then sent towards a polarization separator cube CSP, so as to equally distribute the signal wave to be detected on the two detectors $D_1$ and $D_2$ in providing for the equality of the phases.

The reference wave is injected into the detection head, for example by an optical fiber FO. It is collimated by means of a objective $L_3$ and then crosses a multiple order holographic component HOL enabling the controlled formation of a wave formed by a set of elementary plane waves of known wave vectors directed towards the centers of the elementary shutters of a second spatial light modulator $SLM_2$, which is for example an optical valve. The modulator $SLM_2$ is positioned in the intermediate focal plane of an afocal device $(L_4, L_5)$. It enables the selection of the direction of the wave vector of the elementary reference plane wave collinear to the direction of instantaneous aim of the equipment. This wave then goes through a quarter-wave plate $(\lambda/4)$ making it possible, by means of the separator cube CPS, to obtain an in-quadrature distribution of the reference wave on the two detectors $D_1$ and $D_2$. For example, since the reference wave is linearly polarized, the quarter-wave plate converts the rectilinear polarization into a circular polarization and is then intercepted by the polarization separator cube. The cube CSP separates the circularly polarized reference wave into a linearly polarized wave parallel to the signal wave, incident for example on the detector $D_1$ and into a linearly polarized reference wave with a polarization perpendicular to the signal wave incident on the detector $D_2$.

In this example, the detection means are formed by a matrix of fast detectors of the photodiode type followed by an electronic circuitry enabling the demodulation of the photocurrent for each detector, substantially at the difference in frequency between the signal wave and the reference wave. Thus, in this exemplary embodiment, the two quadrature components of the complex amplitude of the signal wave are separated before demodulation by means of two detectors $D_1$ and $D_2$. Furthermore, the demodulation is provided by the electronic circuit rather than by digital processing as for example in the case of FIG. 2. Thus, this embodiment has the advantage, as compared with the example of FIG. 2, of providing for a difference in frequency between the signal wave and the reference wave that is limited by the technology used by the electronic circuit (i.e. a typical difference in frequency of 100 kHz to 10 Mhz). This difference is no longer limited by the image rate $f_{im}$ of the CCD camera (typically to several tens of Hz). In each application, there is a choice made, as in the example of FIG. 2, of the form of modulation of the phase between the signal wave and the reference wave and of the demodulation frequency adapted to the application.

In the example of FIG. 5, it has been chosen to obtain a demodulation on two distinct detectors of the two quadrature components. It must be noted that, if the technology of the detector allows it, this double demodulation could be integrated into a single detector capable of producing two electrical quadrature components.

Thus, the device according to the invention, whether it is in the exemplary embodiment of FIGS. 2 and 4 or of that in FIG. 5 enables a wide field high resolution digital recording of the complex amplitude $A_s(x,y,z=z_D)$ in a plane positioned between the object DUT and the detector DET and placed up-line from the filtering means when these means are implemented. It is then possible to compute the complex amplitude $A_s(x,y,z)$ throughout the plane $\Pi(z)$ of the unoccupied space between the object and the detector. Indeed, if we consider the propagation of a plane wave with a wave vector k from a plane $\Pi_0(z=0)$ to a plane $\Pi(z)$, the amplitude in the plane $\Pi(z)$ can be conventionally expressed within the limits of the Fresnel conditions as a product of convolution between the complex amplitude in the plane $\Pi_0$ and a propagator $P(x,y,z_0)$ given by:

$$P(x, y, z_D) = \exp\left(i\frac{k}{2z_D}(x^2 + y^2)\right) \quad (5)$$

Whence he complex amplitude of the wave in the plane Π(z) is written as follows:

$$A_S(x, y, z_D) = \frac{\exp(ikz_D)}{i\lambda z_D}(A_S(x, y, z_0) \otimes P(x, y, z_D)) \quad (6)$$

Thus, if we take z=−D in the expression (6) where D is the distance between the object DUT and the plane $\Pi_D$ of FIG. 2, we obtain an image of the object called a "contact" image. The device according to the invention may thus be an example applied to a system of 3D mapping of an object comprising, in addition to the means described here above, computation means enabling the computation, on the basis of the complex amplitude $(A_s(r,z_0))$ of the signal wave coming from the object and measured substantially on the plane of the detector, of the complex amplitude $A_s(r,z)$ of the signal wave coming from the object in any plane Π(z) of the free space included between the object and the detector and especially the boundary of the object thus enabling a contact image of the object. From said complex amplitude, with the object illumination wave being known, it is possible to determine the coordinates (x,y) of the points of the object in said plane Π(z) that are the origin of the scattering of the illumination wave. This makes it possible to map the object.

The device according to the invention thus enables a measurement of the phase of the complex amplitude $A_s(r,z)$ of the signal wave coming from the object, giving a direct measurement of the distance along the axis zz'. Since the phase is measured to within 2π, the device gives the equivalent, for the dimension z, of a fine vernier scale capable of measuring up to λ/2, where λ is the wavelength of the laser source enabling the emission of the wave WEM. Furthermore, the field depth of the reconstructed image, which is about one millimeter, constitutes a rough vernier scale. Since the object is illuminated in reflection it is possible, according to the invention, to create a medium-precision vernier scale enabling the removal of the ambiguity on the phase value and consequently enabling the removal of the ambiguities of position, which are typically between 10 to 100 microns. For this purpose, the holography device according to the invention, whatever the variants of implementation described here above, furthermore comprises means for sweeping through the emission wavelength (WEM). By obtaining a step-by-step variation in the wavelength, typically with a step that may range from $10^{-6}\lambda$ to $10^{-3}\lambda$, it is then possible, on the basis of the measurements of the phase obtained for each of these wavelengths, to determine the absolute value of the phase being sought.

Advantageously, the device according to the invention furthermore comprises means to modulate the optical frequency of the laser so that all the points of frequency between two sweeping steps can be covered. This modulation is aimed at generating the equivalent of a rough vernier scale that eliminates all ambiguity, while eliminating the interferences that occur for an optical path difference between the signal wave and the reference wave that is greater than the pitch of the medium-precision vernier scale. For example, for a emission frequency pitch of the order of 20 GHz, a sawtoothed modulation of the optical frequency from −10 GHz to +10 GHz is performed, in making 10 to 100 sawteeth during the acquisition of each image (giving, for a 25 Hz image frequency, a modulation of 250 to 2500 Hz).

In practice, when a step-by-step sweep in optical frequency of the laser is done, it is possible, after the acquisition of a given number of steps, to perform a frequency/time Fourier transform for each point of the image measured in terms of complex amplitude reconstructed in the plane of the object. For each period of time t, this operation gives the pulsed image of the complex amplitude reconstructed in the plane of the object, that would have been obtained at the instant t by illuminating the object at the instant 0 with a picosecond or femtosecond laser pulse. Thus, the response of the object to a laser pulse is obtained without having to implement a costly laser source such as a femtosecond laser source or a fast and costly detector such as a streak camera.

What is claimed is:

1. A device to determine the complex amplitude $A_s(r,z)$ of a signal wave coming from an object illuminated by an illumination wave, the device comprising:

detection means for detecting waves optoelectronically;

means for generating two mutually coherent waves including said illumination wave and a reference wave, the two mutually coherent waves having a phase difference $\phi_r(t)$ that is a function of time;

filtering means, positioned between the object and the detection means, for limiting to a given elementary angular field the signal wave coming from the object;

means for inducing an interference, on the detection means, between the reference wave and said signal wave coming from the object and limited to said elementary angular field, the detection means enabling a temporal sampling of the interference pattern, resulting in an acquisition of a number N of interferograms $I_i(r,t)$, N being greater than or equal to 2, each interferogram corresponding to a distinct phase difference between the signal wave and the reference wave incident on said detection means;

processing means for calculating, based on said interferograms, the complex amplitude $A_s(r,z)$ of said signal wave coming from the object and limited to said elementary angular field, resulting in an elementary digital hologram; and means to sweep through a set of elementary angular fields resulting in a set of elementary digital holograms, said processing means being configured to combine said set of elementary holograms to obtain a digital hologram of the object.

2. A device according to claim 1, wherein:

N is at least 3; and said processing means is configured to calculate the complex amplitude $A_s(r,z)$ of the signal wave from a linear combination of said interferograms.

3. A device according to claim 2, wherein:

N is equal to 4, said N interferograms $I_i(r,t)$ correspond to distinct phase differences substantially equal to 0, π/2, π, 3π/2 corresponding respectively to $I_1(r,t), I_2(r,t), I_3(r,t), I_4(r,t)$, and said processing means is configured to calculate the in-phase part of the complex amplitude $A_s(r,z_0)$ from the difference $I_1(r,t)-I_3(r,t)$, and to calculate the in-quadrature part from the difference $I_4(r,t)-I_2(r,t)$.

4. A device according to any one of the preceding claims, wherein said means for generating is configured to generate the reference and illumination waves having said phase difference $\phi_r(t)$ variable in stages as a periodic function of the time, and equal to N distinct values successively.

5. A device according to one of the claims 1 to 3, wherein said means for generating is configured to generate the reference and illumination waves being offset in frequency by an offset frequency, the interference between the reference wave and the signal wave coming from the object resulting in an interferogram I(r,t) modulated as a function of time, having a sine modulation at said offset frequency.

6. A device according to claim 1, wherein the means for generating comprise a coherent source emitting an emission wave and two acousto-optical modulators, working at predetermined frequencies on opposite orders of diffraction, in order to form the illumination wave and the reference wave from said emission wave, wherein said emission wave and said reference wave are offset by an offset frequency.

7. A device according to claim 6, wherein
the first acousto-optical modulator intercepts the emission wave, transmits a part of the emission wave to form the illumination wave and generates a first wave offset in frequency with reference to the emission wave, by a first frequency variation, the second acousto-optical modulator intercepts said first frequency-offset wave and generates a second wave offset in frequency, with respect to the first wave, by a second frequency variation equal to the difference between said offset frequency and the first frequency variation, the second wave forming the reference wave having, with reference to the illumination wave, a frequency offset equal to said offset frequency.

8. A device according to claim 1, wherein the means for generating comprises two independent laser sources phase-locked by an electronic automatic control loop and configured to generate said illumination and reference waves having said phase difference $\phi_r(t)$.

9. A device according to claim 1, further comprising:
means to carry out apparent rotations of the object about a direction normal to a plane of the detection means, each apparent position of the object resulting in an elementary digital hologram, and wherein said processing means is configured to combine said elementary holograms to obtain a high-resolution digital hologram of the object.

10. A device according to claim 1, wherein the detection means comprises a detector comprising a set of elementary detectors and having an integration time, an acquisition rate, and an acquisition frequency, the detector integrating said interferograms $I_i(r,t)$ during the integration time to give N averaged interferograms $I_i(r,t)$ at said acquisition rate, corresponding to N distinct values of the phase difference between the signal wave and the reference wave, the processing means being configured to compute a digital hologram of the object from said averaged interferograms.

11. A device according to claim 10, wherein the means for generating is configured to generate the reference and illumination waves being offset in frequency by an offset frequency substantially equal to the acquisition frequency divided by N.

12. A device according to claim 10, wherein the means for generating is configured to generate the reference and illumination waves being offset in frequency by an offset frequency substantially equal to the sum of a vibration frequency of said object and $f_{im}/N$, where $f_{im}$ is said acquisition frequency of said detector.

13. A device according to one of the claims 10 to 12, wherein:
said filtering means for limiting to a given elementary angular field the signal wave coming from the object comprises a filtering hole positioned in the intermediate focal plane of an afocal device intercepting the signal wave coming from the object and formed by two objectives, the filtering hole being substantially centered on the axis of the objective located nearest to the detector; and said means to sweep through a set of elementary angular fields comprise means to shift the filtering hole, the objective positioned facing the detector and the detector jointly and fixedly with respect to one another, in a plane perpendicular to the direction of the axes of the objectives.

14. A device according to claim 10, wherein the means for generating is configured to generate the reference and illumination waves being offset in frequency by an offset frequency substantially equal to the sum of one of the harmonics of a vibration frequency of said object and $f_{im}/N$ where $f_{im}$ is said acquisition frequency of said detector.

15. A device according to claim 14 wherein:
said filtering means for limiting to a given elementary angular field the signal wave coming from the object comprises a filtering hole positioned in the intermediate focal plane of an afocal device intercepting the signal wave coming from the object and formed by two objectives, the filtering hole being substantially centered on the axis of the objective located nearest to the detector; and said means to sweep through a set of elementary angular fields comprise means to shift the filtering hole, the objective positioned facing the detector and the detector jointly and fixedly with respect to one another, in a plane perpendicular to the direction of the axes of the objectives.

16. A device according to claim 1, wherein:
the means for generating is configured to generate the reference and illumination waves being offset in frequency by an offset frequency, the detection means is configured to synchronously detect the interferograms $I_i(r,t)$ at a frequency substantially equal to the offset frequency, and wherein the processing means is directly provided by an electronic circuitry of said detection means.

17. A device according to claim 1, wherein the means for generating comprises a laser source for the emission of a wave enabling the formation, from said emission wave, of the illumination wave and the reference wave, the object is illuminated in reflection, and the device further comprises means for sweeping through the wavelength of the emission wave, enabling removal of ambiguities on the absolute value of the phase of the measured complex amplitude of the signal wave.

18. A system of 3D mapping of an object comprising the device according to claim 1, further comprising computation means configured to compute:

on the basis of the complex amplitude of the signal wave coming from the object and measured substantially on the plane of the detection means, the complex amplitude of the signal wave coming from the object in any plane of a free space included between the object and the detector, on the basis of said complex amplitude, with the object illumination wave being known, the coordinates of points of the object in said any plane, said points being at the origin of a scattering of the illumination wave.

* * * * *